(12) United States Patent
Matsumoto et al.

(10) Patent No.: US 9,797,656 B2
(45) Date of Patent: Oct. 24, 2017

(54) VEHICLE INTERIOR HEAT EXCHANGER AND INTER-HEADER CONNECTING MEMBER OF VEHICLE INTERIOR HEAT EXCHANGER

(71) Applicant: Sanden Corporation, Isesaki-shi, Gunma (JP)

(72) Inventors: Yuuichi Matsumoto, Isesaki (JP); Yusuke Iino, Isesaki (JP)

(73) Assignee: SANDEN HOLDINGS CORPORATION, Isesaki-Shi, Gunma (JP)

( * ) Notice: Subject to any disclaimer, the term of this patent is extended or adjusted under 35 U.S.C. 154(b) by 383 days.

(21) Appl. No.: 14/386,901

(22) PCT Filed: Feb. 21, 2013

(86) PCT No.: PCT/JP2013/054366
§ 371 (c)(1),
(2) Date: Sep. 22, 2014

(87) PCT Pub. No.: WO2013/145965
PCT Pub. Date: Oct. 3, 2013

(65) Prior Publication Data
US 2015/0053376 A1    Feb. 26, 2015

(30) Foreign Application Priority Data
Mar. 27, 2012 (JP) .................. 2012-070770

(51) Int. Cl.
*F28D 1/04* (2006.01)
*B60H 1/00* (2006.01)
(Continued)

(52) U.S. Cl.
CPC ....... *F28D 1/0417* (2013.01); *B60H 1/00328* (2013.01); *F28D 1/05308* (2013.01);
(Continued)

(58) Field of Classification Search
CPC .......... F28F 9/02; F28F 9/0224; F28F 9/0226; F28F 9/0278; F28F 9/0265; F28D 1/05391; F28D 1/05341
(Continued)

(56) References Cited

U.S. PATENT DOCUMENTS 5,816,316 A * 10/1998 Hoffnung .............. F28F 9/0224
165/173
6,449,979 B1    9/2002 Nagasawa et al.
(Continued)

FOREIGN PATENT DOCUMENTS

EP    2 314 966    4/2011
JP    H01-160276 U    11/1989
(Continued)

OTHER PUBLICATIONS

International Search Report dated May 28, 2013, which issued during prosecution of International Application No. PCT/JP2013/054366, which corresponds to the present application.

*Primary Examiner* — Dominick L Plakkottam
*Assistant Examiner* — Joel Attey
(74) *Attorney, Agent, or Firm* — Troutman Sanders LLP

(57) ABSTRACT

Cooling performance is secured by reducing a compression loss when a high-pressure gas refrigerant is allowed to flow without heat exchange on cooling in a vehicle interior heat exchanger. In the vehicle interior heat exchanger, an upstream header and a downstream header are communicated and connected with the same end side of the refrigerant circulation tubes of an upstream tube group and a downstream tube group where the refrigerant circulation tubes are stacked. Internal spaces of the upstream header and the downstream header are communicated and connected with each other via communication holes in the boss portions of the connecting member. In the vehicle interior heat exchanger, the total opening area of the communication (Continued)

holes is set such that the percentage thereof, with respect to the total opening area of the channel on the uppermost stream side of the upstream tube group, is in the range of 38% to 93%.

3 Claims, 8 Drawing Sheets

(51) Int. Cl.
*F28D 1/053* (2006.01)
*F25B 39/02* (2006.01)
*F28F 9/02* (2006.01)
*F28D 21/00* (2006.01)

(52) U.S. Cl.
CPC ........ F28D 1/05391 (2013.01); F28F 9/0204 (2013.01); F28F 9/026 (2013.01); *F25B 39/028* (2013.01); *F28D 1/05341* (2013.01); *F28D 2021/008* (2013.01); *F28F 9/02* (2013.01); *F28F 9/0224* (2013.01); *F28F 9/0226* (2013.01); *F28F 9/0265* (2013.01); *F28F 9/0278* (2013.01)

(58) Field of Classification Search
USPC .................. 165/173, 174, 175, 176; 62/160
See application file for complete search history.

(56) References Cited

U.S. PATENT DOCUMENTS

| | | | |
|---|---|---|---|
| 8,413,715 B2* | 4/2013 | Saito | F25B 39/022 165/153 |
| 8,701,750 B2* | 4/2014 | Oh | F28D 1/05391 165/174 |
| 2004/0205966 A1* | 10/2004 | Ohishi | B21D 19/08 29/889.2 |
| 2005/0172664 A1* | 8/2005 | Cho | F28D 1/05391 62/515 |
| 2006/0191673 A1* | 8/2006 | Inaba | F25B 39/022 165/153 |
| 2006/0213651 A1* | 9/2006 | Higashiyama | F28D 1/05391 165/174 |
| 2010/0243223 A1* | 9/2010 | Lim | F25B 39/022 165/173 |
| 2011/0083466 A1 | 4/2011 | Lim et al. | |
| 2011/0167850 A1* | 7/2011 | Itoh | F25B 5/04 62/160 |
| 2013/0061631 A1* | 3/2013 | Katoh | F28D 1/0426 62/515 |

FOREIGN PATENT DOCUMENTS

| | | |
|---|---|---|
| JP | H06-159863 | 6/1994 |
| JP | 11142087 A * | 5/1999 |
| JP | H11-142087 | 5/1999 |
| JP | 2001-074388 | 3/2001 |
| JP | 2003-021490 | 1/2003 |
| JP | 2003-106793 | 4/2003 |
| JP | 2005-043041 | 2/2005 |
| JP | 2007-263421 | 10/2007 |
| JP | 2010-538239 | 12/2010 |
| JP | 2011-523023 | 8/2011 |
| JP | 2012-007821 | 1/2012 |
| WO | 2009/031782 | 3/2009 |

* cited by examiner

VEHICLE INTERIOR HEAT EXCHANGER AND INTER-HEADER CONNECTING MEMBER OF VEHICLE INTERIOR HEAT EXCHANGER

CROSS REFERENCE TO RELATED APPLICATIONS

This application is a U.S. National Phase Application under 35 U.S.C. §317 of International Patent Application PCT/JP2013/054366 filed on Feb. 21, 2013 and claims benefit of priority to Japanese Patent Application 2012-070770 filed Mar. 27, 2012. The International Application was published on Oct. 3, 2013, as International Publication No. WO 2013/145965 under PCT Article 21(2). The entire contents of these applications are hereby incorporated by referance.

TECHNICAL FIELD

The present invention relates to a vehicle interior heat exchanger in a vehicular heat pump device, and to a member for connecting a pair of headers of the vehicle interior heat exchanger together in communication with each other.

BACKGROUND ART

A heat exchanger in a heat-pump type air conditioner of a vehicle equipped with an engine is disclosed in Patent Literature 1. In this heat exchanger (functioning as a condenser or an evaporator), a pair of headers are connected together to communicate with the same end side of the upstream and downstream tube groups each having a plurality of stacked refrigerant circulation tubes. Portions of internal spaces of the pair of headers are connected together in communication with each other via a connecting member.

Hence, a counter-flow structure, in which a refrigerant flown in from the upstream tube group is caused to flow out to the downstream tube group, is formed to enable the heat exchange efficiency with the blown air to be improved. Further, when it is used as a vehicle interior heat exchanger, the temperature of the air (heating air or cooling air) blown to the vehicle interior can be homogenized.

CITATION LIST

Patent Literature

Patent Literature 1: JP 11-142087 A

SUMMARY OF INVENTION

Problems to be Solved by the Invention

Meanwhile, as described below, there is a possible approach using a vehicle interior heat exchanger as a condenser for heating and blocking an air inlet port on cooling to make the refrigerant flow in gas form hardly performing heat exchange with the air. In this approach, costs can be reduced compared with the structure in which the refrigerant bypasses the vehicle interior heat exchanger on cooling.

However, if the heat exchanger, described in Patent Literature 1, is used in this approach, only one hole is formed in the connecting member. The percentage of the cross-sectional area of the hole allowing the headers to communicate with each other, with respect to the total cross-sectional area of the upstream channel, is too small. As such, the compression loss of the refrigerant when passing through the communication hole becomes larger, whereby the cooling performance is deteriorated.

The present invention was developed by focusing on such a conventional problem. An object of the present invention is to maintain the cooling performance properly by suppressing a compression loss even in the case where a vehicle interior heat exchanger is used as described above.

Solutions to the Problems

To solve such a conventional problem, in a vehicle interior heat exchanger of a vehicular air conditioner according to the present invention: an upstream tube group and a downstream tube group each having a plurality of stacked refrigerant circulation tubes are aligned in an air-blowing direction of a vehicle interior air-blowing path; and at least portions of internal spaces of a pair of headers communicated and connected with a same end side of the refrigerant circulation tubes of the respective tube groups are connected with each other in a communicating manner via a communication hole. A total cross-sectional area of the communication hole allowing the internal spaces to communicate with each other is set such that a percentage of the total cross-sectional area of the communication hole, with respect to a total cross-sectional area of a channel on an uppermost stream side of the upstream tube group, is in a range of 38% to 93%.

In addition, in a connecting member between headers of a vehicle interior heat exchanger according to the present invention, an upstream tube group and a downstream tube group each having a plurality of stacked refrigerant circulation tubes are aligned in an air-blowing direction of a vehicle interior air-blowing path; and the connecting member is connected between a pair of headers communicated and connected with a same end side of the refrigerant circulation tubes of the respective tube groups, and allows at least portions of internal spaces of the pair of headers to communicate with each other and connects at least the portions of the internal spaces with each other. The connecting member includes a plurality of boss portions formed to protrude from both sides of a flat plane of a plate-like connecting member, the boss portions penetrating through and being connected with pipe walls of the pair of headers; and communication holes formed inside the boss portions, the communication holes allowing the internal spaces to communicate with each other.

Effects of the Invention

According to the vehicle interior heat exchanger of the vehicular air conditioner of the present invention, the total cross-sectional area of the communication holes that allow the header internal spaces to communicate with each other is set such that the percentage thereof, with respect to the total cross-sectional area of the channel on the uppermost stream side of the upstream tube group, is in the range of 38% to 93%. The compression loss of the refrigerant passing through the communication holes can be therefore sufficiently reduced, while suppressing an increase in the machining costs and deterioration in the strength. As such, the performance on cooling can be maintained properly.

Further, according to the inter-header connecting member of the vehicle interior heat exchanger of the present invention, a pair of headers can be easily connected together via the connecting member, and, with a plurality of communication holes formed inside the boss portions, the compression loss of the refrigerant passing through the communication holes can be reduced sufficiently. As such, the performance on cooling can be maintained properly.

DESCRIPTION OF EMBODIMENTS

Hereinafter, an embodiment of the present invention will be described.

Figure 1:
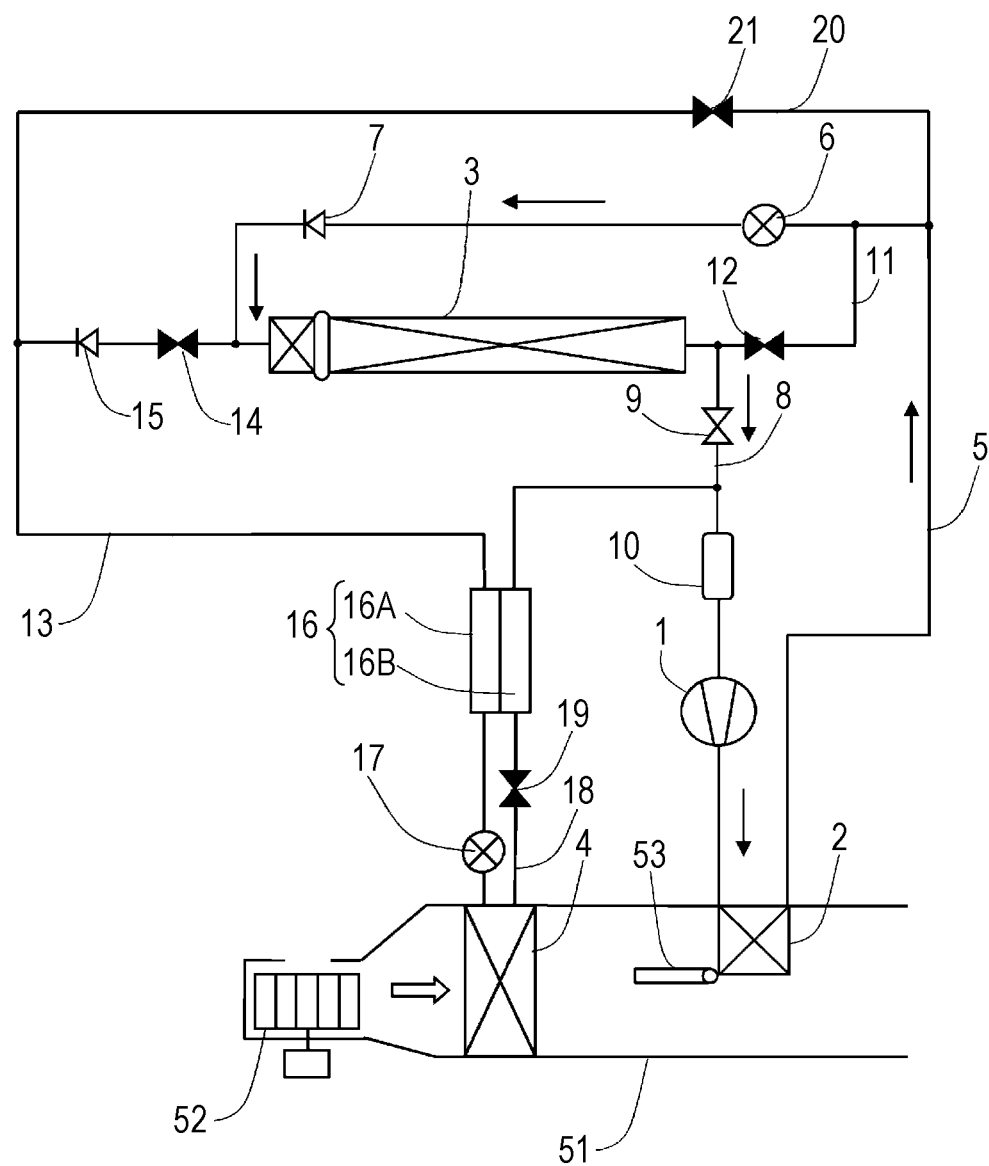
FIG. 1 is a diagram illustrating a flow of refrigerant on heating in a refrigerant circuit of a vehicular air conditioner equipped with a vehicle interior heat exchanger according to the present invention.
Figure 2:
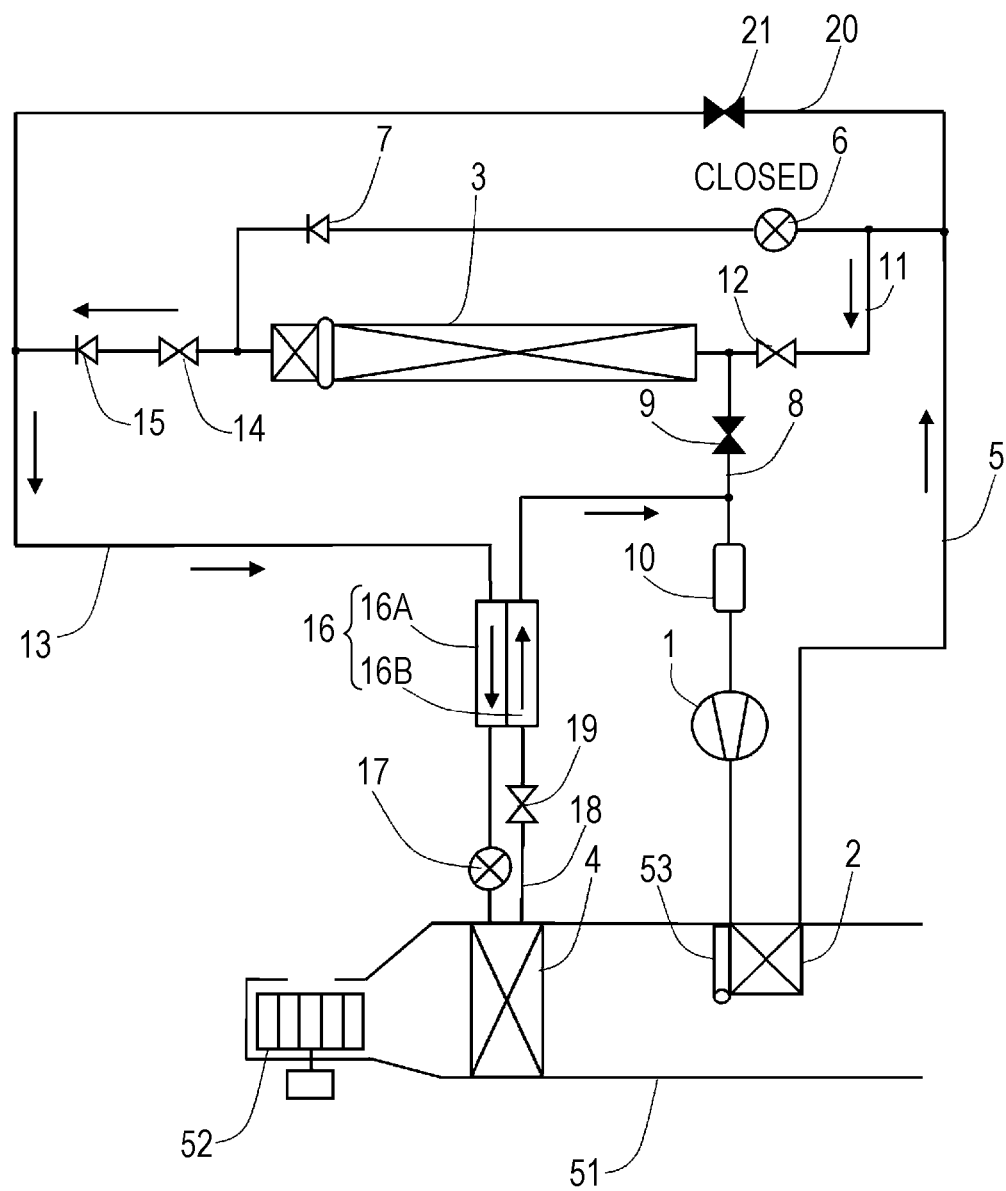
FIG. 2 is a diagram illustrating a flow of refrigerant on cooling in a refrigerant circuit of the vehicular air conditioner.

FIG. 1 and FIG. 2 illustrate the outline of a refrigerant circuit in a heat-pump type vehicular air conditioner equipped with a vehicle interior heat exchanger according to the present invention. It should be noted that a refrigerant circuit, to which the vehicle interior heat exchanger of the present invention is applied, is not limited to this embodiment.

The air conditioner is configured to include a compressor 1, a first vehicle interior heat exchanger 2 disposed downstream of an air-blowing path 51 inside the vehicle interior, a vehicle exterior heat exchanger 3 disposed outside the vehicle interior, and a second vehicle interior heat exchanger 4 disposed on the upstream side of the air-blowing path 51 inside the vehicle interior.

At the upstream end of the air-blowing path 51, a fan 52 is disposed. On the vent hole of the first vehicle interior heat exchanger 2, a damper 53 that freely opens and closes the vent hole is mounted.

A first refrigerant pipe 5 extends from a refrigerant discharge port of the compressor 1 to the vehicle exterior heat exchanger 3 via the first vehicle interior heat exchanger 2. In the middle of the first refrigerant pipe 5, a first expansion valve 6 and a first check valve 7 are interposed. A second refrigerant pipe 8 extends from the vehicle exterior heat exchanger 3 to the refrigerant suction port of the compressor 1. In the middle of the second refrigerant pipe 8, a first on-off valve 9 and an accumulator 10 are interposed.

Further, between the downstream side of the first expansion valve 6 of the first refrigerant pipe 5 and a portion between the vehicle exterior heat exchanger 3 and the first on-off valve 9, a third refrigerant pipe 11 is connected so as to link them. In the third refrigerant pipe 11, a second on-off valve 12 is interposed. Here, as the path resistance of the first expansion valve 6 becomes larger compared with the path resistance of the second on-off valve 12 when the second on-off valve 12 is open, the first expansion valve 6 is closed substantially. However, it may be opened forcibly. As such, the first expansion valve 6 and the second on-off valve 12 are opened selectively.

A fourth refrigerant pipe 13 is disposed to be branched from the downstream side of the first check valve 7 of first refrigerant pipe 5 and extends to the second vehicle interior heat exchanger 4. In the fourth refrigerant pipe 13, a third on-off valve 14, a second check valve 15, a high-temperature portion 16A of an internal heat exchanger 16, and a second expansion valve 17 are interposed.

A fifth refrigerant pipe 18, extending from the second vehicle interior heat exchanger 4 to a portion between the first on-off valve 9 and the accumulator 10, is connected thereto. In the fifth refrigerant pipe 18, a fourth on-off valve 19, and a low-temperature portion 16B of the internal heat exchanger 16 are interposed. In the internal heat exchanger 16, heat is exchanged between the high-temperature refrigerant flowing through the high-temperature portion 16A and the low-temperature refrigerant flowing through the low-temperature portion 16B.

Further, a sixth refrigerant pipe 20 is disposed to extend from the upstream side of the first expansion valve 6 of the first refrigerant pipe 5 to the downstream side of the check valve 15 of the fourth refrigerant pipe 13. In the sixth refrigerant pipe 20, a fifth on-off valve 21 is interposed.

Next, the outline of the air conditioner when operation will be described.

On heating, the damper 53, the first expansion valve 6, and the first on-off valve 9 are opened, and the second on-off valve 12, the third on-off valve 14, the fourth on-off valve 19, and the fifth on-off valve 21 are closed.

As illustrated in FIG. 1, high-temperature and high-pressure gas refrigerant, compressed by the compressor 1, is flown into the first vehicle interior heat exchanger 2, performs heat exchange with the air blown from the fan 52 (discharges heat), and is condensed and liquidated. With the heat exchange, the air is heated. The heated air is blown to the vehicle interior to heat the vehicle interior.

Then, the liquid refrigerant flows through the first expansion valve 6, is decompressed to be in a gas-liquid mixed state, and flows into the vehicle exterior heat exchanger 3 via the first check valve 7. In the vehicle exterior heat exchanger 3, the refrigerant exchanges heat with (absorbs heat from) the outside air and is vaporized (gasified). Then, the refrigerant is back to the suction port of the compressor 1 via the first on-off valve 9 and the accumulator 10, and is compressed. This cycle is repeated.

Meanwhile, when cooling, the second on-off valve 12, the third on-off valve 14, and the fourth on-off valve 19 are opened, and the damper 53, the first expansion valve 6, the first on-off valve 9, and the fifth on-off valve 21 are closed.

As illustrated in FIG. 2, the refrigerant compressed by the compressor 1 flows through the first vehicle interior heat exchanger 2. However, as the damper 53 is closed, the air blown to the first vehicle interior heat exchanger 2 is blocked. As such, heat exchange between the refrigerant and the blown air (cooling) is hardly performed. The refrigerant is flown out in a high-temperature and high-pressure state, and is flown into the vehicle exterior heat exchanger 3 via the second on-off valve 12.

The vehicle exterior heat exchanger 3 functions as a condenser. The gas refrigerant exchanges heat with (discharges heat to) the outside air, and is condensed and liquidated. The liquid refrigerant flows to the second expansion valve 17 through the third on-off valve 14, the check valve 15, and the low-temperature portion 16A of the internal heat exchanger 16. The liquid refrigerant is decompressed by the second expansion valve 17 to be in a gas-liquid mixed state, and flows into the second vehicle interior heat exchanger 4. In the second vehicle interior heat exchanger 4, the refrigerant exchanges heat with (absorbs heat from) the air blown from the fan 52, and is gasified. The air cooled by the heat exchange is blown to the vehicle interior to cool the vehicle interior.

Meanwhile, when dehumidifying, the damper 53 is opened in the above-described cooling state, as a simple way. Thus, the air, which is cooled and condensed by the second vehicle interior heat exchanger 4 to reduce the moisture, is reheated by the downstream first vehicle interior heat exchanger 2. Thus, air having a relatively low humidity can be fed into the vehicle interior. Further, in order to improve the cooling dehumidifying function by the second vehicle interior heat exchanger 4, the fifth on-off valve 21 interposed in the sixth refrigerant pipe 20 may be opened to cause an increase in flow rate of the refrigerant blown to the second vehicle interior heat exchanger 4.

As described above, the first vehicle interior heat exchanger 2 operates as a condenser when heating, while allowing the refrigerant to flow without performing heat exchange with the air when cooling. The first vehicle interior heat exchanger 2 is configured as described below.

Figure 3:
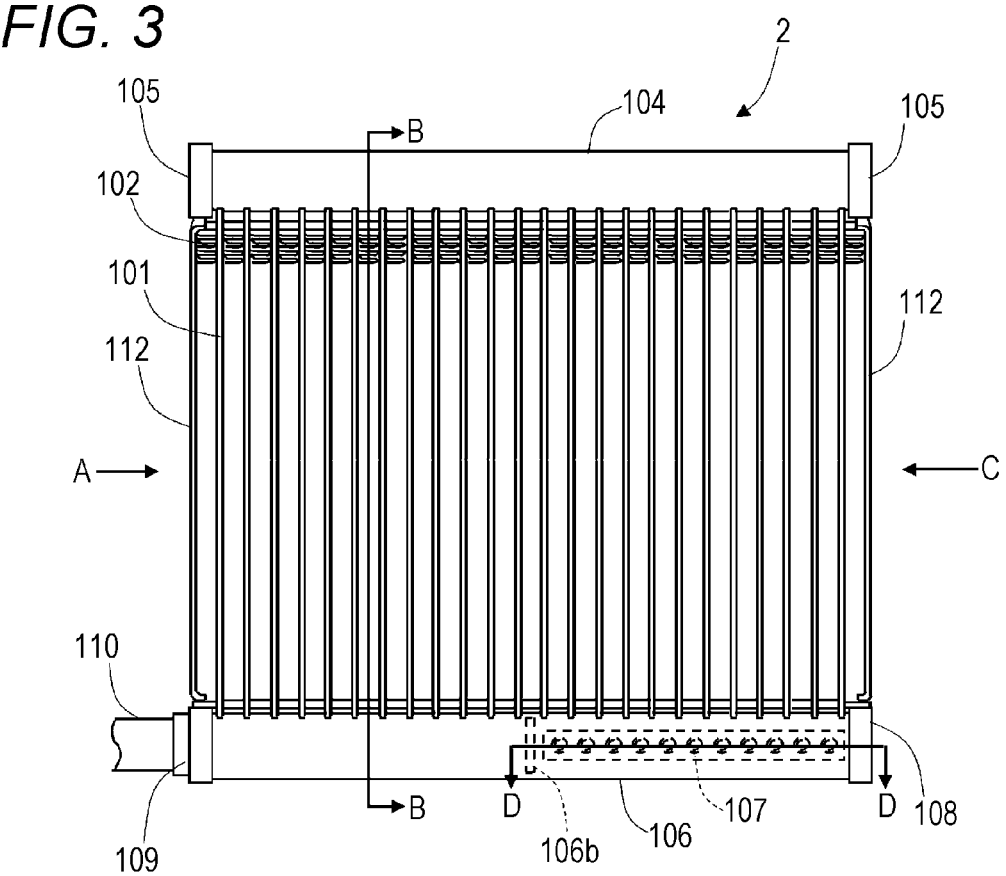
FIG. 3 is a front view of the vehicle interior heat exchanger viewed from the downstream side in an air-blowing direction.
Figure 4:
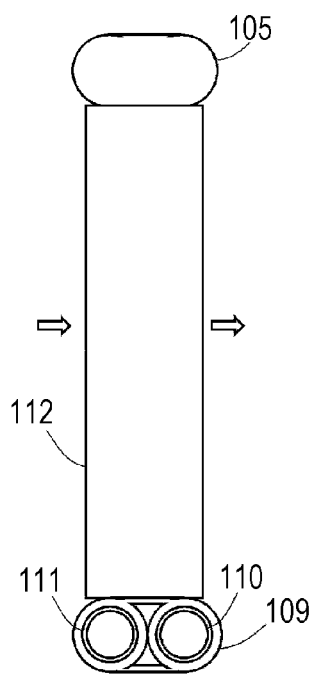
FIG. 4 is a side view viewed from the direction of an arrow A in FIG. 3.
Figure 5:
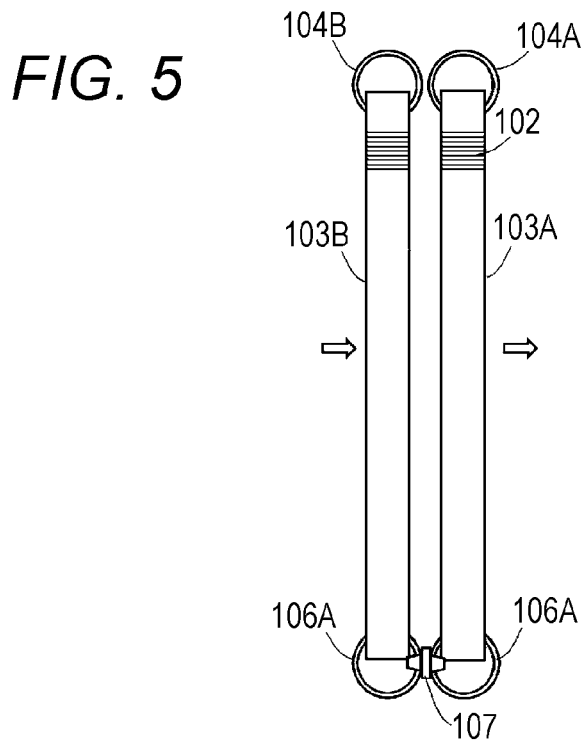
FIG. 5 is a cross-sectional view viewed from the direction of an arrow B-B in FIG. 3.
Figure 6:
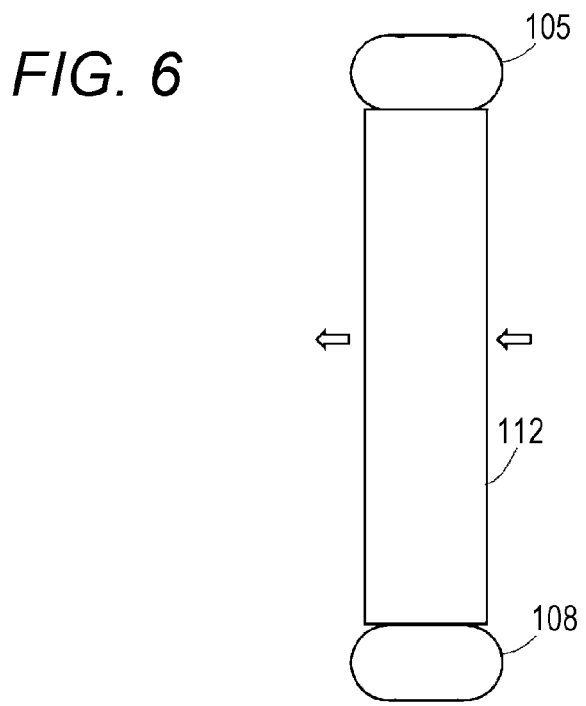
FIG. 6 is a side view viewed from the direction of an arrow C in FIG. 3.

FIG. 3 is a front view of the second vehicle interior heat exchanger 2 viewed from the downstream side in the air-blowing direction. FIG. 4 is a view viewed from the direction of an arrow A in FIG. 3. FIG. 5 is a cross-sectional view viewed from the direction of an arrow B-B in FIG. 3. FIG. 6 is a side view viewed from the direction of an arrow C in FIG. 3.

Each of a plurality of refrigerant circulation tubes 101 has a flattened channel cross section. The plurality of refrigerant circulation tubes 101 is stacked via a corrugated fin 102 (only upper portion is shown in the figure) to form a pair of tube groups 103A and 103B. The pair of tube groups 103A and 103B faces each other. The pair of tube groups 103A and 103B are spaced to form two rows and disposed upstream and downstream of the air-blowing path 51 in the air-blowing direction. The respective refrigerant circulation tubes 101 and the corrugated fin 102 are fixed by brazing or the like.

On each of both sides in the tube axis direction of the tube groups 103A and 103B in two rows, a pair of cylindrical headers is disposed, respectively. The cylindrical header extends in the stacked direction (in the present embodiment, lateral direction shown in the figure) of the refrigerant circulation tubes 101.

Figure 7:
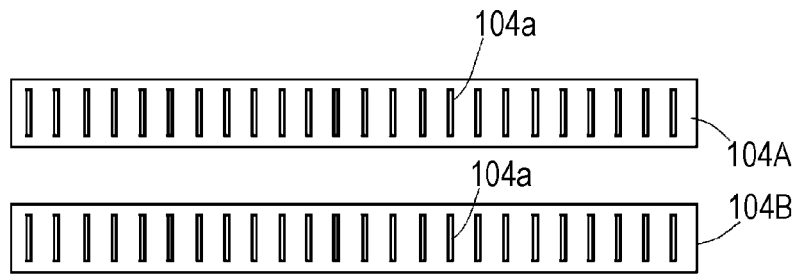
FIG. 7 is a bottom view of a pair of headers disposed at the top end of the vehicle interior heat exchanger.

A pair of headers 104A and 104B is disposed on one side (upper side in the figure) in the axial direction of the refrigerant circulation tubes 101. As illustrated in FIG. 7, the pair of headers 104A and 104B are respectively in a form in which a plurality of holes 104a for inserting one end portions (upper end portions) of the refrigerant circulation tubes 101 of the respective tube groups are opened. The one end portions (upper end portions in the figure) of the refrigerant circulation tubes 101 of the respective tube groups 103A and 103B are inserted in the plurality of corresponding holes 104a of the headers 104A and 104B, and are fixed by brazing.

Figure 8:
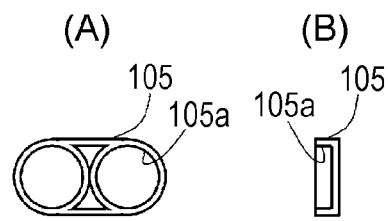
FIG. 8 is a side view and a cross-sectional view of a lid member connected with the both ends of the pair of headers.
Figure 9:
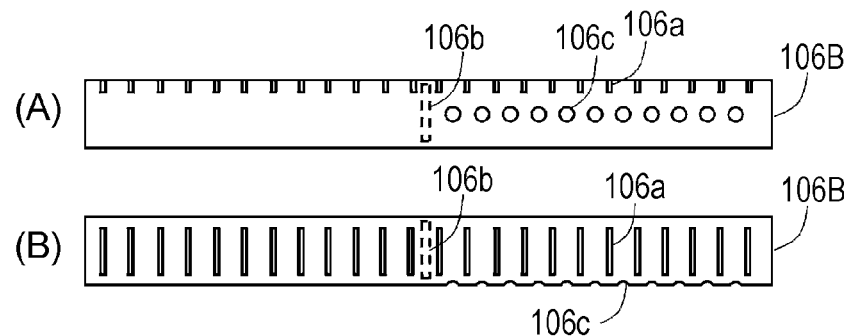
FIG. 9 is a plan view and a front view of a pair of headers disposed at the bottom end of the vehicle interior heat exchanger.
Figure 9:
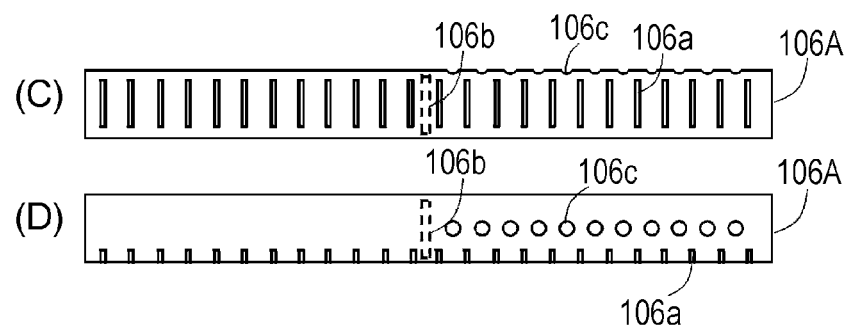

Further, the respective opening ends on both sides of the headers 104A and 104B are engaged and sealed in a pair of cylindrical engaging portions 105a formed in an oval lid member 105 in as illustrated in FIG. 8, and are fixed by brazing.

A pair of headers 106A and 106B is disposed on the other side (lower side in the figure) in the axial direction of the refrigerant circulation tubes 101. The pair of headers 106A and 106B are in a form in which a plurality of holes 106a for inserting the other end portions (lower end portions in the figure) of the refrigerant circulation tubes 101 of the respective tube groups 103A and 103B are opened, which are the same as the headers 104A and 104B. The other end portions (lower end portions) of the refrigerant circulation tubes 101 of the respective tube groups 103A and 103B are inserted in the plurality of corresponding holes 106a of the headers 106A and 106B, and are fixed by brazing.

Further, the internal space of each of the headers 106A and 106B is partitioned, at an intermediate portion in the axial direction, into a plurality of spaces (two in the present embodiment) by a disk-shaped partition member 106b. The partition member 106b is fixed to the inner wall of each of the pair of headers 106A and 106B by brazing.

Further, a plurality of boss through holes 106c are formed in each of the inner walls, facing each other, in one of the portions (right side in the figure) partitioned by the partition member 106b of the headers 106A and 106B.

Figure 10:
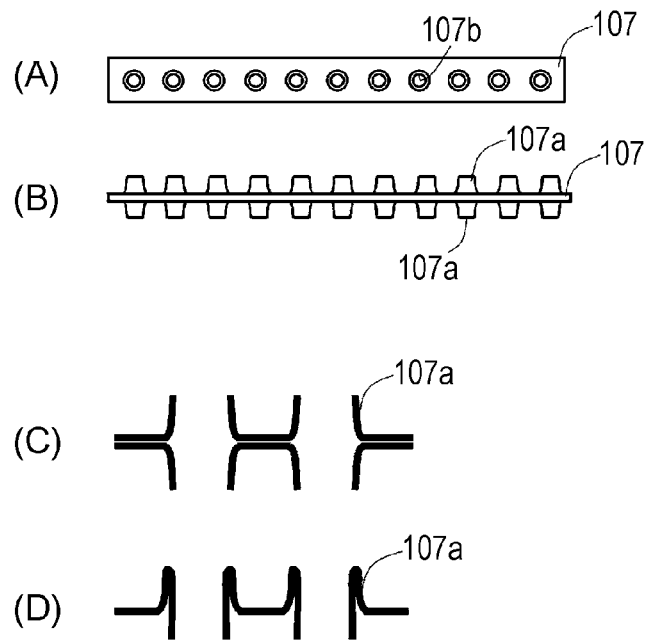
FIG. 10 illustrates a plan view and a front view of a connecting member that connects a pair of headers, disposed at the bottom end of the vehicle interior heat exchanger, with each other in a communicating manner, and two different exemplary forming methods.
Figure 11:
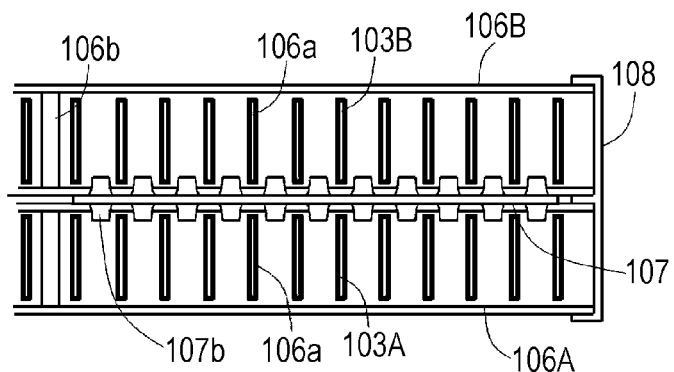
FIG. 11 is a cross-sectional view viewed from the direction of an arrow D-D in FIG. 3.

Further, as illustrated in FIG. 10(A) and (B), a connecting member 107 is formed to include a plate member, and boss portions 107a each having a communication hole 107b inside thereof and protruding from both sides of the flat portion of the plate member. As illustrated in FIG. 11, the boss portions 107a of the connecting member 107 penetrate the boss through holes 106c of the headers 106A and 106B and are fixed by brazing.

The boss portions 107a of the connecting plate 107 can be formed by forming a pair of plate members each of which is formed by being applied with burring so as to protrude from the surface of one side, and superposing them in opposite directions and fixing them by brazing or the like, as illustrated in FIG. 10(C).

Meanwhile, as illustrated in FIG. 10(D), it is also possible to use machining of a well-known method in which burring is first performed on one plate member so as to make it protrude from the surface of one side thereof, and then burring from the opposite direction is performed so as to make it protrude from the opposite side.

Further, by forming the outer diameter of the boss portion 107a to be smaller than the interval between adjacent refrigerant circulation tubes 101 (height of the corrugated fin 102), the boss portion 107b can be accommodated between the adjacent refrigerant circulation tubes 101, as illustrated in FIG. 11, and an interference between the adjacent refrigerant circulation tubes 101 and the boss portion 107b can be prevented.

The opening ends on one side (right side in the figure) in the axial direction of the headers 106A and 106B are fitted in a pair of cylindrical engaging portions of a lid member 108, formed in the same manner as the lid member 105 illustrated in FIG. 7, and sealed and fixed by brazing.

Figure 12:
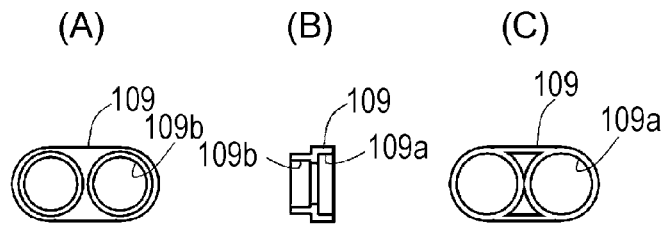
FIG. 12 is both side views and a cross-sectional view of an adapter connected with one end of a pair of headers disposed at the bottom end of the vehicle interior heat exchanger.

The opening ends on the other side (left side in the figure) in the axial direction of the headers 106A and 106B are engaged with a pair of cylindrical engaging portions 109a formed in an adapter 109, opening in the axial direction, as illustrated in FIG. 12, and are fixed by brazing.

In a pair of cylindrical engaging portions 109b of the adapter 109, on a side opposite to the side on which the headers 106A and 106B are mounted, a refrigerant flow-in pipe 110 is engaged with one of the cylindrical engaging portions 109b (for example, on the downstream side in the air-blowing direction,), and a refrigerant flow-out pipe 111 is engaged with the other one (on the upstream side in the air-blowing direction), and are fixed by brazing.

Further, on both ends in the stacking direction of the tube groups 103A, 103B, 106A, and 106B, reinforcement plates 112 are fixed by brazing respectively, as illustrated in FIG. 3.

Figure 13:
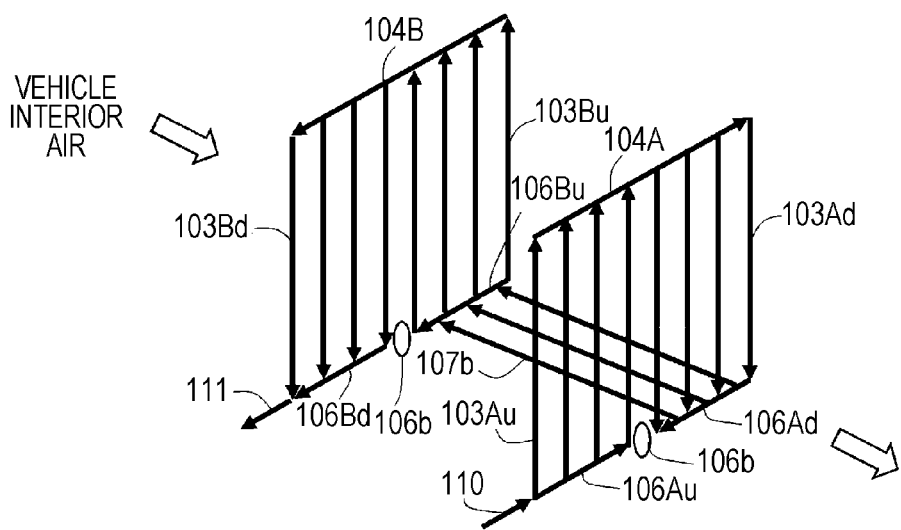
FIG. 13 is a schematic perspective view illustrating a flow of refrigerant in the vehicle interior heat exchanger.

The flow of the refrigerant in the first vehicle interior heat exchanger 2, formed as described above, is as shown by the arrows illustrated in FIG. 13.

The refrigerant flows from the refrigerant flow-in pipe 110 into the lower-side header 106A. The refrigerant flows into the lower end openings of a plurality of refrigerant circulation tubes 101 (first tube group 103Au) approaching a first header space 106Au in front of the partition plate 106b, and flows through the first tube group 103Au in an upward direction.

Further, the refrigerant flows from the upper end openings of the first tube group 103Au into the upper-side header 104A. Then, the refrigerant flows into a plurality of refrigerant circulation tubes 101 (second tube group 103Ad) on the inner side (right side in the figure) from the upper end openings, and flows through the second tube group 103Ad in a downward direction.

Then, the refrigerant flows into a second header space 106Ad, which is on an inner side from the partition plate 106b, from the lower end openings of the second tube group 103Ad.

Then, the refrigerant flows through the communication holes 107b in the boss portions 107a of the connecting member 7, approaching the second header space 106Ad. The refrigerant flows into an inner-side third header space 106Bu from the partition plate 106b of the adjacent header 106B.

The refrigerant flows in from the lower end openings of a plurality of refrigerant circulation tubes 101 (third tube group 103Bu) approaching a third header space 106Bu, and flows through the third tube group 103Bu in an upward direction.

Further, the refrigerant flows into the header 104B from the upper end openings of the third tube group 103Bu. Then, the refrigerant flows through a fourth tube group 103Bd in a downward direction from the upper end openings of the refrigerant circulation tubes 101 (fourth tube group 103Bd) on the front side (left side in the figure).

Then, the refrigerant flows into a fourth header space 106Bd in front of the partition plate 106b, from the lower end openings of the fourth tube group 103Bd, and flows out from the refrigerant flow-out pipe 111.

When the vehicle interior heat exchanger 2 functions as a condenser on heating, during the time that the refrigerant flows through the respective refrigerant circulation tubes 101 of the two tube groups 103A and 103B as described above, the refrigerant comes in contact with the outer surfaces of the respective tubes 101 and discharges heat by heat exchange with the blown air flowing therethrough. Further, the refrigerant discharges heat by heat exchange with the corrugated fin 102 cooled by the blown air, which comes in contact with the outer surfaces similarly. Thereby, the refrigerant is cooled efficiently, and is condensed and liquidated.

Then, by the refrigerant channel of the counter flow type, on the front side (left side in FIG. 13), an area near the refrigerant inlet where high-temperature gas refrigerant flows in a high density, in the downstream tube group 103A in the air-blowing direction, and an area near the refrigerant outlet where condensed low-temperature refrigerant flows, in the upstream tube group 103B in the air-blowing direction, overlap along the air-blowing direction.

On the other hand, a difference between the temperature (or gas/liquid ratio) of the refrigerant flowing through the downstream tube group 103A in the air-blowing direction, and the temperature (or gas/liquid ratio) of the refrigerant flowing through the upstream tube group 103B, becomes smaller at a farther location toward the opposite side (inner side).

This means that in the entire region of a cross-section of the air-blowing path, an average value (average temperature or average gas/liquid ratio) of the refrigerant temperature (gas/liquid ratio) of the downstream tube group 103A in the air-blowing direction and the refrigerant temperature (gas/liquid ratio) of the upstream tube group 13B is homogenized. Thereby, as the temperature of the heating air blown to the vehicle interior, while flowing through the first vehicle interior heat exchanger 2 and exchanging the heat, is homogenized, comfortable heating can be performed.

On the other hand, when cooling, the damper 53 is closed whereby the air blown to the first vehicle interior heat exchanger 2 is blocked, as described above. As such, the refrigerant does not exchange heat with the blown air (cool) substantially, and flows in a high-temperature and high-pressure gas state. This is because the air cooled by the second vehicle interior heat exchanger 4 is suppressed from being reheated by heat exchange with the first vehicle interior heat exchanger 2. Further, compared with the system in which the refrigerant is caused to bypass the first vehicle interior heat exchanger 2, a bypass valve and a bypass channel can be omitted, which leads to cost reduction.

In the case of adopting such an approach, if a compression loss increases when the high-pressure gas refrigerant passes through the vehicle interior heat exchanger on cooling, deterioration in the cooling performance is the problem.

The present applicant focused on the fact that a compression loss in the counter holes (communication holes 107b of the connecting member 107), which allowed the gas refrigerant to flow from the upstream header to the downstream header, largely affected the cooling performance. The present applicant obtained the following results from experimentations and simulations.

Figure 14:
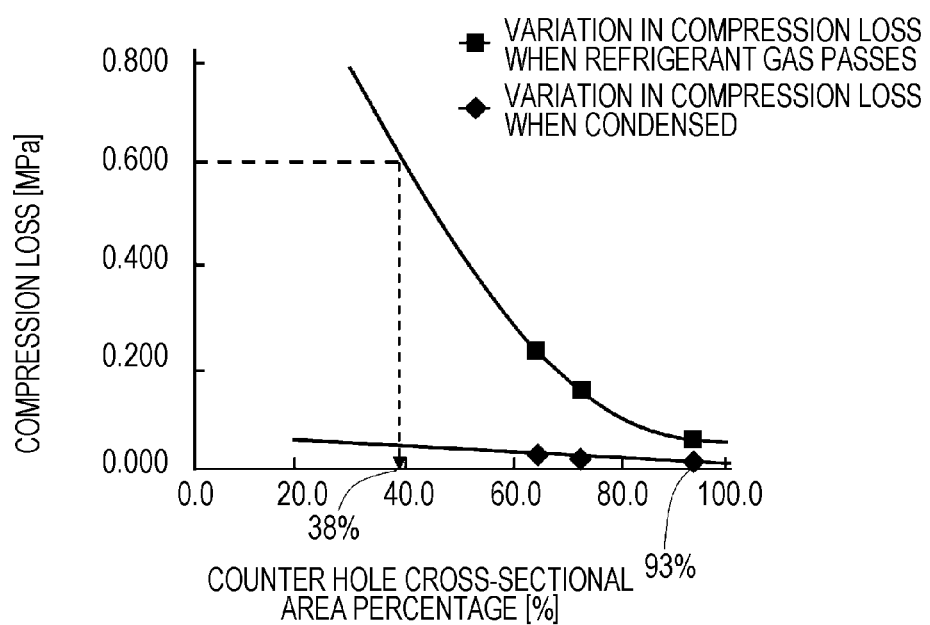
FIG. 14 is a diagram illustrating a relationship between a counter hole cross-sectional area percentage and a compression loss.

FIG. 14 illustrates a relationship between the percentage of the total cross-sectional area of the counter holes (communication holes 107b of the connecting member 107) with respect to the total cross-sectional area of the uppermost stream channels (tube group 103Au) (counter hole cross-sectional area percentage), and a compression loss.

A compression loss, when a high-pressure refrigerant flows on cooling, has a characteristic that while the compression loss has a larger value if the counter hole cross-sectional area percentage is smaller, the compression loss decreases significantly as the counter hole cross-sectional area percentage increases.

Figure 15:
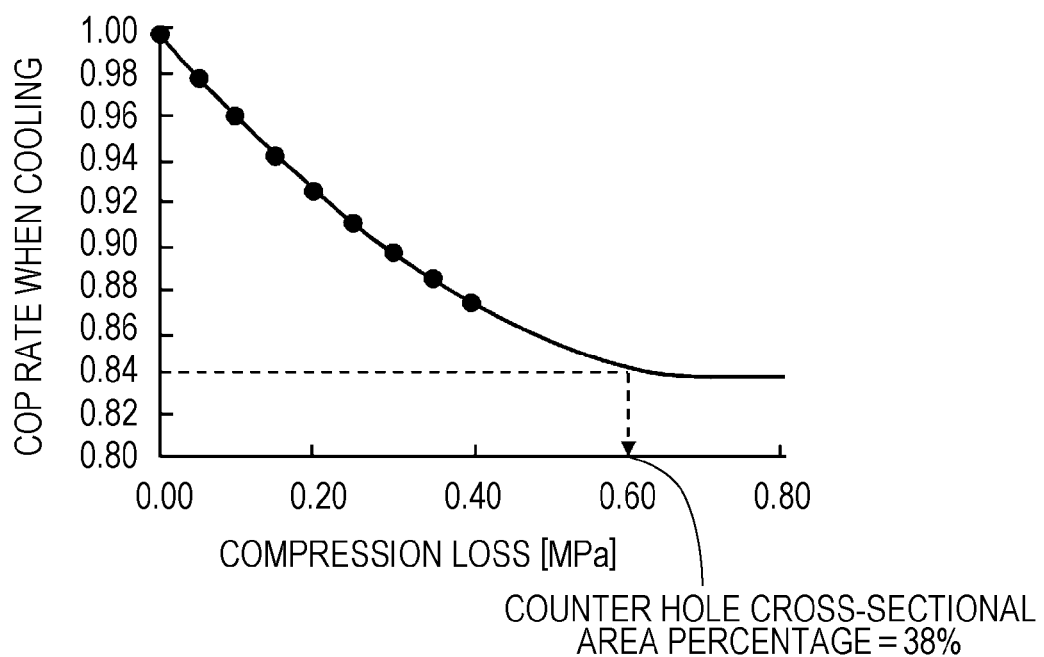
FIG. 15 is a diagram illustrating a relationship between a compression loss and a COP rate on cooling.

On the other hand, as illustrated in FIG. 15, it was found that a COP (coefficient of performance) rate (cooling performance/power consumption) indicating the cooling performance on cooling was lowered corresponding to an increase in the compression loss, and that a COP rate was maintained at an almost constant level when the compression loss became a certain level or higher. Specifically, a counter hole cross-sectional area percentage that the compression loss became a level (about 0.60 [MPa]) at which the COP rate is started to be maintained at an almost constant level, was about 38%.

Hence, it is obvious that in a region where the counter hole cross-sectional area percentage is less than 38%, even if the counter hole cross-sectional area percentage is increased, an effect of improving the COP rate due to a decrease in a compression loss is not achieved, and that in a region where the counter hole cross-sectional area percentage is 38% or more, an effect of improving the COP rate due to a decrease in the compression loss is achieved corresponding to an increase in the counter hole cross-sectional area percentage.

Further, as illustrated in FIG. 14, even if the counter hole cross-sectional area percentage is caused to be larger than 93%, the compression loss on cooling is maintained at an almost constant level, and further improvement in the COP rate is not expectable. This means that the number and the cross-sectional area of the communication holes 107b are increased unnecessarily, which brings an increase in machining costs and deterioration in strength.

On the other hand, a compression loss when the refrigerant is condensed on heating has a characteristic that even in the case where the counter hole cross-sectional area percentage is small, the compression loss is extremely low compared with the case where a high-pressure gas refrigerant flows on cooling, and the compression loss decreases gradually corresponding to an increase in the counter hole cross-sectional area percentage, as illustrated in FIG. 14.

As described above, a compression loss on heating is small by nature, and a drop in the COP rate on heating due to a compression loss is as small as a negligible level, compared with the case of cooling.

In consideration of the results described above, it was determined that the counter hole cross-sectional area percentage [=(total cross-sectional area of the communication holes 107b)/(total cross-sectional area of the tube group 103Au)] was set to be in the range of 38% to 93%.

By setting such a counter hole cross-sectional area percentage, good cooling performance can be secured even when a high-pressure gas refrigerant is caused to flow by blocking the blown air on cooling, as well as the time of heating when the first vehicle interior heat exchanger 2 is used as a condenser. Further, an increase in machining costs and deterioration in strength can be suppressed.

Further, by using the connecting member 107 formed as described above, the second header space 106Ad and the third header space 106Bu can be easily communicated and connected with each other. The counter hole cross-sectional area percentage described above can be therefore achieved, thereby maintaining good cooling performance and securing the strength.

Further, the total cross-sectional area of the uppermost stream tube group 103Au is set to be larger than the cross-sectional area of the inlet pipe 110. Thereby, a compression loss when the refrigerant is flown from the inlet pipe 110 into the tube group 103Au is also suppressed. As such, a compression loss of the vehicle interior heat exchanger 2 can be suppressed as much as possible, and deterioration in the cooling performance can be suppressed as much as possible.

Further, in the embodiment described above, by partitioning the inside of the header with a partition plate, the channel is converted such that the flow of the refrigerant has two path channels in the upstream tube group 103A and has two path channels in the downstream tube group 103B. By increasing the number of such conversions, homogenization of the temperature of the blown air described above can be promoted. However, as a simple way, two paths, the entire upstream tube group and the entire downstream tube group, may be provided without partitioning the header. Alternatively, a larger number of channel paths may be provided by setting a larger number of partitions, for example.

Further, instead of the corrugated fin 102, a configuration in which flat plate fins in a plurality of rows, penetrating the respective refrigerant circulation tubes, are disposed in a vertical direction is also acceptable.

DESCRIPTION OF REFERENCE SIGNS

1 Compressor, 2 First vehicle interior heat exchanger, 4 Second vehicle interior heat exchanger, 5 First refrigerant pipe, 6 First expansion valve, 7 First check valve, 8 Second refrigerant pipe, 9 First on-off valve, 10 Accumulator, 11 Third refrigerant pipe, 12 Second on-off valve, 13 Fourth refrigerant pipe, 14 Third on-off valve, 15 Second check valve, 16 Internal heat exchanger, 17 Second expansion valve, 18 Fifth refrigerant pipe, 19 Fourth on-off valve, 51 Air-blowing path, 52 Fan, 53 damper, 101 Refrigerant circulation tube, 102 Corrugated fin, 103A, 103B Tube group, 104A, 104B Header, 106A, 106B Header, 106b Partition plate, 106c Boss through hole, 107 Connecting member, 107a Boss portion, 107b Communication hole, Third header space 106Bu

The invention claimed is:

1. A vehicle interior heat exchanger of a vehicular air conditioner, the vehicle interior heat exchanger comprising:
an upstream tube group and a downstream tube group, the tube groups each having a plurality of stacked refrigerant circulation tubes and being aligned in an air-blowing direction of a vehicle interior air-blowing path; and
a pair of headers communicated and connected with a same end side of the refrigerant circulation tubes of the respective tube groups, in which at least portions of internal spaces of the pair of headers are connected with each other in a communicating manner via a communication hole, wherein
a total cross-sectional area of the communication hole allowing the internal spaces to communicate with each other is set such that a percentage of the total cross-sectional area of the communication hole, with respect to a total cross-sectional area of a channel on an uppermost stream side of the upstream tube group, is in a range of 38% to 65%,
wherein a plurality of boss portions formed on a connecting member so as to protrude from both sides of a flat plane of the connecting member, the boss portions penetrating through and being connected with pipe walls of the pair of headers, wherein the boss portions can be formed by a pair of plate members, each of which formed by burring so as to protrude from the surface of one side, superimposed in opposite directions, and fixed by brazing, wherein the headers communicate with each other via a plurality of communication holes formed inside the boss portions, and wherein an outer diameter of each of the boss portions is smaller than an interval between the refrigerant circulation tubes adjacent to each other, and the boss portion is disposed between the refrigerant circulation tubes.

2. The vehicle interior heat exchanger according to claim 1, wherein the vehicle interior heat exchanger functions as a condenser on heating, and when cooling, air blown in the air-blowing path is blocked, and the vehicle interior heat exchanger allows a refrigerant from a compressor to flow in a gas state and supplies the refrigerant to a condenser outside the vehicle interior.

3. The vehicle interior heat exchanger according to claim 1, wherein a total cross-sectional area of respective refrigerant circulation tubes at an upstream end of the upstream tube group is larger than a cross-sectional area of an inlet pipe to be connected with an inlet portion of a header connected with the upstream end of the upstream tube group.

* * * * *